(12) United States Patent
Ma

(10) Patent No.: US 7,969,527 B2
(45) Date of Patent: Jun. 28, 2011

(54) DISPLAY APPARATUS

(75) Inventor: Zhi-Peng Ma, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 163 days.

(21) Appl. No.: 12/275,209

(22) Filed: Nov. 20, 2008

(65) Prior Publication Data

US 2010/0020483 A1    Jan. 28, 2010

(30) Foreign Application Priority Data

Jul. 25, 2008  (CN) .......................... 2008 1 0303071

(51) Int. Cl.
*G02F 1/1333* (2006.01)
*H05K 5/00* (2006.01)

(52) U.S. Cl. ........ 349/58; 349/56; 349/122; 361/679.21
(58) Field of Classification Search .................... 349/58, 349/56, 122; 361/679.21; 400/472
See application file for complete search history.

(56) References Cited

U.S. PATENT DOCUMENTS

| | | | | |
|---|---|---|---|---|
| 1,340,066 | A * | 5/1920 | Lemle | 160/331 |
| 5,777,704 | A * | 7/1998 | Selker | 349/58 |
| 6,826,859 | B1 * | 12/2004 | Lin | 40/514 |
| 7,129,657 | B2 * | 10/2006 | Cavarec et al. | 318/280 |
| 7,248,465 | B2 * | 7/2007 | Lin | 361/679.55 |
| 2005/0147448 | A1 * | 7/2005 | Lin | 400/472 |
| 2005/0206206 | A1 * | 9/2005 | Peng | 297/217.3 |
| 2005/0207102 | A1 * | 9/2005 | Russo | 361/683 |
| 2006/0266482 | A1 * | 11/2006 | Montano | 160/134 |
| 2008/0020150 | A1 | 1/2008 | Kim et al. | 428/1.31 |
| 2009/0161222 | A1 * | 6/2009 | Liou et al. | 359/601 |
| 2010/0020483 | A1 * | 1/2010 | Ma | 361/679.21 |

* cited by examiner

*Primary Examiner* — Brian M Healy
(74) *Attorney, Agent, or Firm* — Frank R. Niranjan

(57) ABSTRACT

A display apparatus includes a housing, a display, and a screen protection device. The housing defines a receiving portion therein. The display is received in the housing, and displays images in an operative state and is powered off in a non-operative state. The screen protection device is received in the receiving portion when the display is in the operative state, and covers the display when the display is in the non-operative state.

12 Claims, 3 Drawing Sheets

DISPLAY APPARATUS

BACKGROUND

1. Technical Field

The present disclosure relates to display apparatuses, and more particularly, relates to a display apparatus with protection mechanism.

2. Description of Related Art

Display apparatuses, particularly flat panel display apparatuses, are widely used in various products, such as computers, televisions, mobile phones, and so on. Generally, a display apparatus includes a housing and a display received in the housing.

However, contaminants such as dust and dirt accumulates on the display and may degrade it.

Therefore, a need exists for a display apparatus to resolve the above problem.

BRIEF DESCRIPTION OF THE PULLINGS

DETAILED DESCRIPTION

Figure 1:
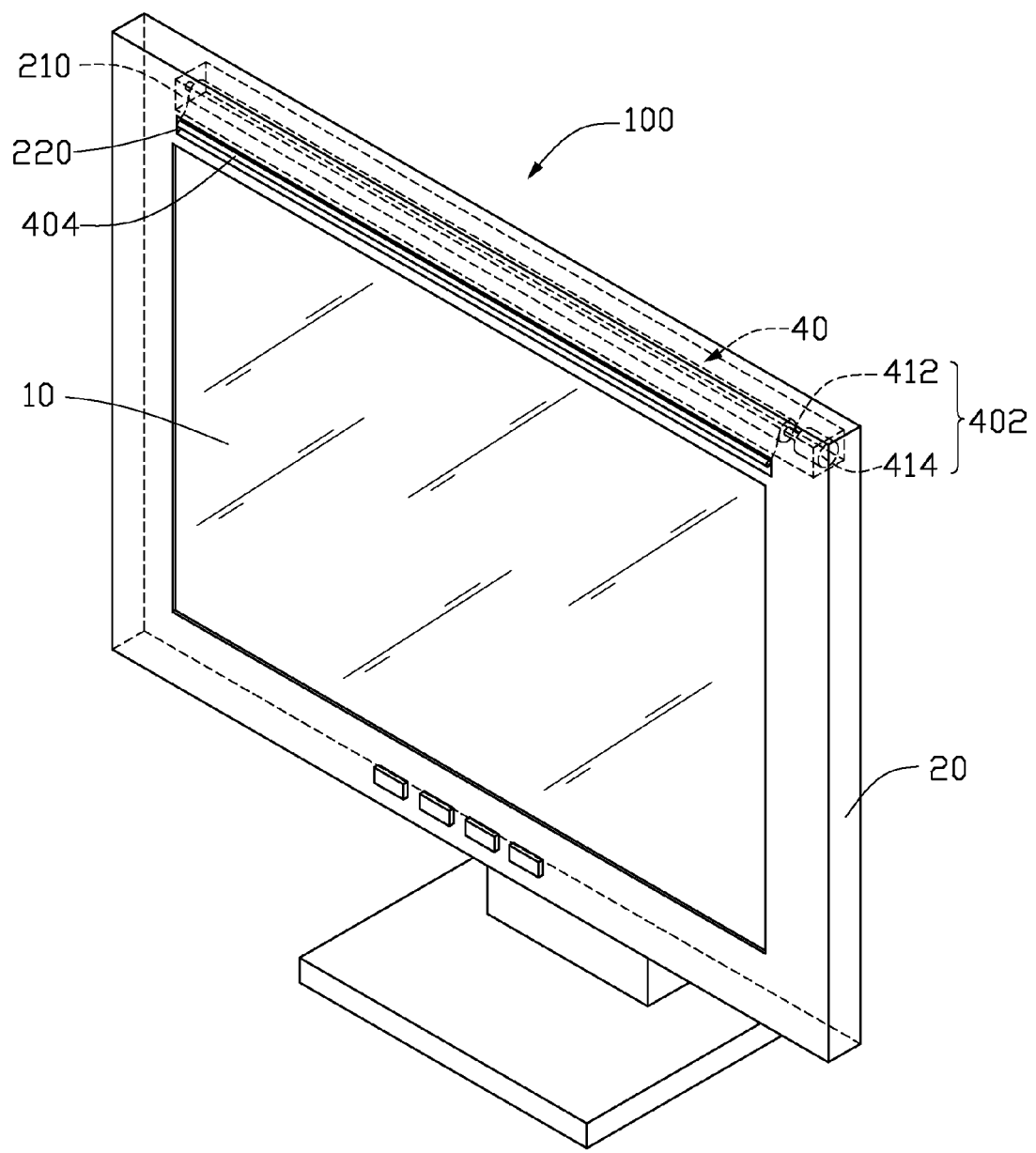
FIG. 1 is a perspective view of a display apparatus in accordance with an exemplary embodiment.
Figure 2:
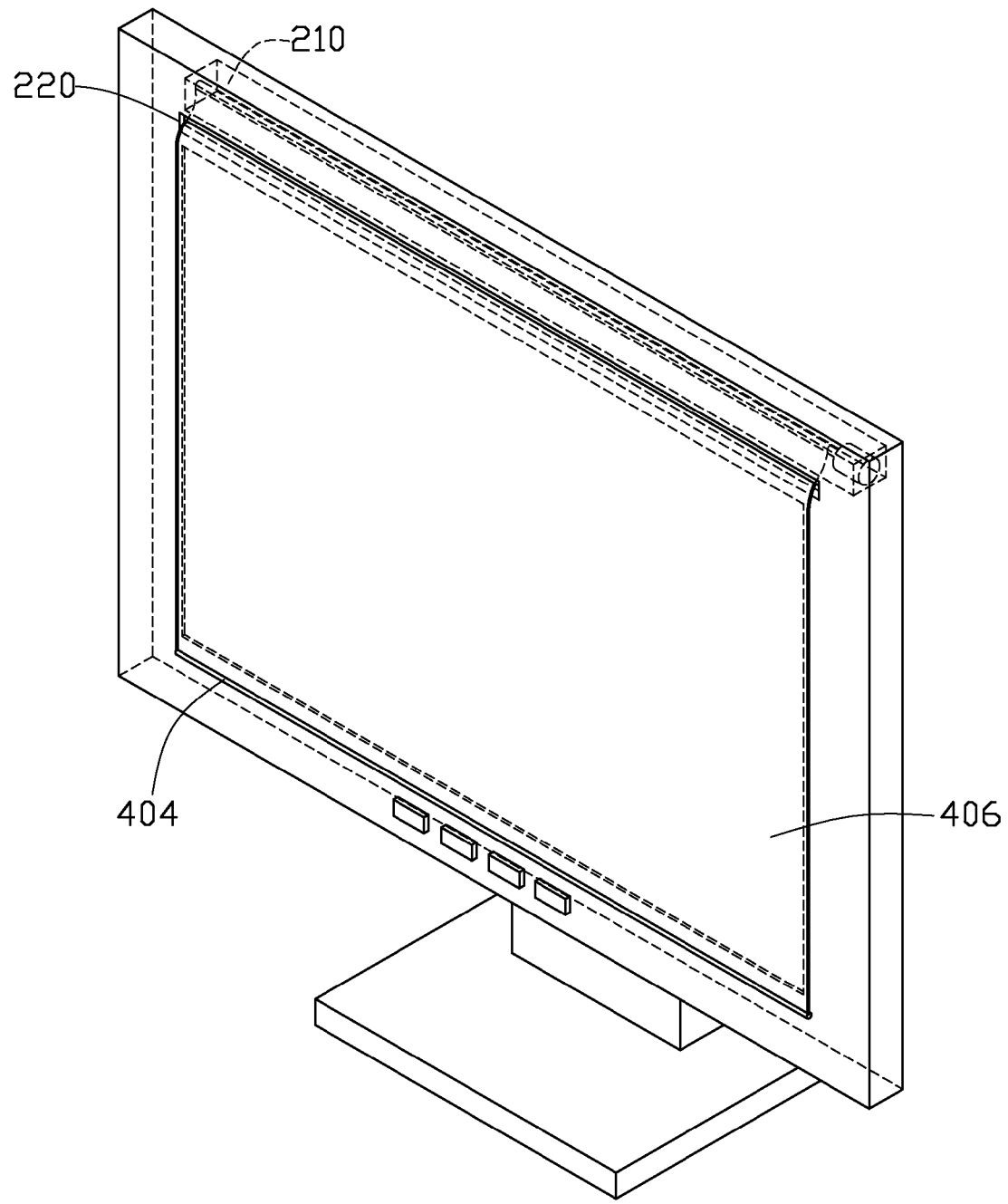
FIG. 2 is an operative state of the display apparatus of FIG. 1.
Figure 3:
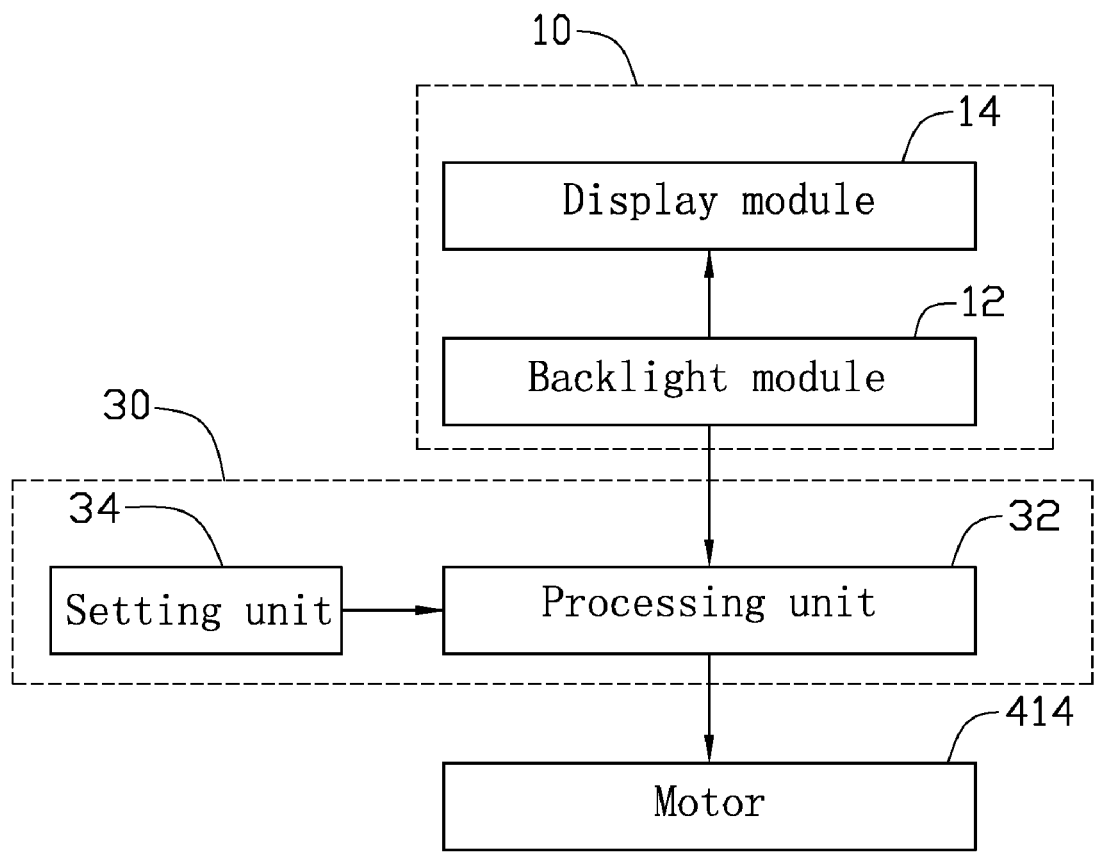
FIG. 3 is a block diagram showing functional modules of a motor control system of the display apparatus.

Referring to FIGS. 1, 2 and 3, a display apparatus 100 includes a display 10, a housing 20, a motor control system 30, and a screen protection device 40. The display 10 is received in the housing 20, and displays images in an operative state and is powered off in a non-operative state. The motor control system 30 is used for detecting whether the display 10 is in the operative state or in the non-operative state, and controlling the screen protection device 40 to expose or cover the display 10 according to detected results.

The display 10 includes a backlight module 12 and a display module 14. The backlight module 12 emits light towards the display module 14, and the display module 14 allows some of the light to pass through according to video signals provided by peripheral devices (not shown), so as to display images. The display 10 can be a liquid crystal display (LCD), or any other flat display.

The housing 20 defines a receiving portion 210 in an area above the display 10, and a rectangular slot 220 in an upper side of a front surface of the housing 20. The slot 220 communicates with the receiving portion 210, and is located between the receiving portion 210 and the display 10. The slot 220 slopes downwards from the receiving portion 210 towards the display 10.

The motor control system 30 includes a processing unit 32 and a setting unit 34. The motor control system 30 is integrated in a circuit board (not shown) fixed in the display apparatus 100. The processing unit 32 detects the backlight module 12 of the display 10 to determine whether the display 10 is in the operative state or the non-operative state, and then generates the first control signal or the second control signal to the screen protection device 40. The setting unit 34 presets a stop rotation condition to the processing unit 32. If the stop rotation condition is met, the processing unit 32 disables the screen protection device 40.

In the embodiment, when the display 10 is in the operative state, the screen protection device 40 is received in the receiving portion 210 and exposes the display 10. When the display 10 is in the non-operative state, the screen protection device 40 is activated to move out of the receiving portion 210, pass through the slot 220, and cover the display 10. Therefore, when the display 10 is powered off, it can be protected from contaminants.

In detail, the screen protection device 40 includes a power transmission mechanism 402, a weight rod 404, and a protection curtain 406. The power transmission mechanism 402 is fixed in the receiving portion 210. The protection curtain 406 is made of flexible materials. A first end of the protection curtain 406 is attached to the power transmission mechanism 402, and a second end of the protection curtain 406 is capable of passing through the slot 220 to expose out of the housing 20 and is attached to the weight rod 404.

When the display 10 is powered on, the power transmission mechanism 402 provides power to wind up the protection curtain 406, and the weight rod 404 will be received in the slot 220. When the display 10 is powered off, the power transmission mechanism 402 unwinds the protection curtain 406. Because the slot 220 slopes downwards from the receiving portion 210 towards the display 10, thus the weight rod 404 can slide out of the slot 220 and pull down the protection curtain 406.

Moreover, the power transmission mechanism 402 includes a shaft 412 and a motor 414. The motor 414 is fixed to one end of the receiving portion 210, and the shaft 412 is fixed between the motor 414 and the other end of the receiving portion 210. The motor 414 drives the shaft 412 to rotate in two reverse directions according to the first control signal and the second control signal generated by the processing unit 32. Besides, the first end of the protection curtain 406 is attached to the shaft 412.

The motor 414 will drive the shaft 412 to rotate in a first direction according to the first control signal, and to rotate in a second direction according to the second control signal. If the stop rotation condition is met, the processing unit 32 disables the motor 414.

In practice, when the backlight module 12 is powered off, the processing unit 32 determines the non-operative state of the display 10, and then generates the first control signal to the motor 414. The motor 414 drives the shaft 412 to rotate in the first direction (counterclockwise direction for example) according to the first control signal, thus the protection curtain 406 is unwound from the shaft 412. If the stop rotation condition is not met, the motor 414 continues rotating the shaft 412. If the stop rotation condition is met, the processing unit 32 disables the motor 414, thus the shaft 412 stops rotating.

When the backlight module 12 is powered on, the processing unit 32 determines the operative state of the display 10, and then generates the second control signal to the motor 414. The motor 414 drives the shaft 412 to rotate in the second direction (clockwise direction for example) according to the second control signal, thus the protection curtain 406 is wound on the shaft 412. If the stop rotation condition is not met, the motor continues driving the shaft 412. If the stop rotation condition is met, the processing unit 32 disables the motor 414, thus the shaft 412 stops rotating.

The stop rotation condition may be implemented using one or more mechanism. Herein, two types of mechanisms will be explained. A first mechanism adopts a predetermined time. When the motor 414 drives the shaft 412 to rotate in the first direction, the processing unit 32 detects first rotating time of the motor 414, and compares the first rotating time with the predetermined time. If the first rotating time is equal to the predetermined time, the processing unit 32 disables the motor

414. Therefore, the shaft 412 stops rotating, the weight rod is received in the slot 220, and the protection curtain 406 exposes the display 10.

When the motor 414 drives the shaft 412 to rotate in the second direction, the processing unit 32 detects second rotating time of the motor 414, and compares the second rotating time with the predetermined time. If the second rotating time is equal to the predetermined time, the processing unit 32 disables the motor 414. Therefore, the shaft 412 stops rotating, and the protection curtain 406 covers the display 10.

A second mechanism adopts a predetermined revolution number. When the motor 414 drives the shaft 412 to rotate in the first direction, the processing unit 32 counts total revolution number of the motor 414, and compares the total revolution number with the predetermined revolution number. If the total revolution number is equal to the predetermined revolution number, the processing unit 32 disables the motor 414.

Similarly, when the motor 414 drives the shaft 412 to rotate in the second direction, the processing unit 32 counts total revolution number of the motor 414, and compares the total revolution number with the predetermined revolution number. If the total revolution number is equal to the predetermined revolution number, the processing unit 32 disables the motor 414.

As mentioned above, in the embodiment, the display apparatus 100 utilizes the processing unit 32 to detect the state of the backlight module 12, so as to determine whether the display 10 is in the operative state or the non-operative state. When the backlight module 12 is powered off, the processing unit 32 determines that the display 10 is in the non-operative state, activates the motor 414 to drive the shaft 412 to rotate in the first direction, as a result the protection curtain 406 is unwound from the shaft 412 and covers the display 10. Therefore, the protection curtain 30 can protect the display 10 from being polluted by dust and dirt.

Alternative embodiments will become apparent to those skilled in the art to which the present invention pertains without departing from the spirit and scope. Accordingly, the present invention should be deemed not to be limited to the above detailed description, but rather by the claims that follow.

What is claimed is:

1. A display apparatus comprising:
    a housing defining a receiving portion therein;
    a display received in the housing, and displaying images in an operative state and being powered off in a non-operative state;
    a screen protection device received in the receiving portion when the display is in the operative state and moved out of the receiving portion to cover the display when the display is in the non-operative state, the screen protection device comprising a protection curtain and a power transmission mechanism winding up the protection curtain to expose the display in the operative state and unwinding the protection curtain to cover the display in the non-operative state, the power transmission mechanism comprising a motor and a shaft, the protection curtain being attached to the shaft; and
    a motor control system for detecting state of the display and activating the motor to drive the shaft to rotate in two reverse directions according to detected results.

2. The display apparatus as claimed in claim 1, wherein the housing defines a slot for allowing the screen protection device to pass through when the display is in the non-operative state, and the slot communicates with the receiving portion.

3. The display apparatus as claimed in claim 2, wherein the slot is located between the receiving portion and the display, and the slot slops downwards from the receiving portion towards the display.

4. The display apparatus as claimed in claim 1, wherein the power transmission mechanism is fixed in the receiving portion.

5. The display apparatus as claimed in claim 1, wherein the screen protection device further comprises a weight rod pulling down the protection curtain when the power transmission mechanism unwinds the protection curtain, and the protection curtain is attached to the weight rod.

6. The display apparatus as claimed in claim 1, wherein the motor is fixed to one end of the receiving portion, and the shaft is fixed between the motor and the other end of the receiving portion.

7. The display apparatus as claimed in claim 6, wherein the display comprises a display module displaying images and a backlight module emitting light towards the display module, the motor control system comprises a processing unit detecting the backlight module to determine whether the display is in the operative state or the non-operative state.

8. The display apparatus as claimed in claim 7, wherein the processing unit determines that the display is in the non-operative state and generates a first control signal when the backlight module is powered off, the motor drives the shaft to rotate in a first direction according to the first control signal, and the protection curtain unwinds from the shaft.

9. The display apparatus as claimed in claim 8, wherein the processing unit determines that the display is in the operative state and generates a second control signal when the backlight module is powered on, the motor drives the shaft to rotate in a second direction according to the second control signal, and the protection curtain is wound up on the shaft.

10. The display apparatus as claimed in claim 7, wherein the motor control system further comprises a setting unit presetting a stop rotation condition used by the processing unit to disable the motor if the stop rotation condition is met.

11. The display apparatus as claimed in claim 10, wherein the stop rotation condition may be implemented using one or more mechanism, one mechanism adopts a predetermined time with which the processing unit compares with a rotating time of the motor to determine whether the motor should be disabled, if the rotating time is equal to the predetermined time, the processing unit disables the motor.

12. The display apparatus as claimed in claim 10, wherein the stop rotation condition may be implemented using one or more mechanism, one mechanism adopts a predetermined revolution number with which the processing unit compares with a total revolution number of the motor to determine whether the motor should be disabled, if the total revolution number is equal to the predetermined revolution number, the processing unit disables the motor.

* * * * *